(12) United States Patent
Rossetto et al.

(10) Patent No.: US 11,182,939 B2
(45) Date of Patent: Nov. 23, 2021

(54) METHOD AND SYSTEM FOR TRANSFORMING MESSAGE LOGS INTO IMAGES

(71) Applicant: Rohde & Schwarz GmbH & Co. KG, Munich (DE)

(72) Inventors: Francesco Rossetto, Vaterstetten (DE); Ghassen Benhadjsalah, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 129 days.

(21) Appl. No.: 16/594,913

(22) Filed: Oct. 7, 2019

(65) Prior Publication Data

US 2021/0104081 A1   Apr. 8, 2021

(51) Int. Cl.
*G06T 11/20* (2006.01)
*G06F 11/07* (2006.01)
*G06N 20/00* (2019.01)
*G06T 11/00* (2006.01)

(52) U.S. Cl.
CPC .......... *G06T 11/206* (2013.01); *G06F 11/079* (2013.01); *G06N 20/00* (2019.01); *G06T 11/001* (2013.01)

(58) Field of Classification Search
CPC ..... G06T 11/206; G06T 11/001; G06N 20/00; G06F 11/079
See application file for complete search history.

(56) References Cited

U.S. PATENT DOCUMENTS

| 4,953,104 | A | * | 8/1990 | Yeh | ........................ | H04N 1/415 |
| | | | | | | 347/115 |
| 7,272,800 | B2 | | 9/2007 | Roth et al. | | |
| 2011/0191653 | A1 | * | 8/2011 | Zeng | .................... | H03M 13/116 |
| | | | | | | 714/763 |
| 2015/0254330 | A1 | | 9/2015 | Chan et al. | | |
| 2016/0065425 | A1 | * | 3/2016 | Poe | ........................ | H04L 43/045 |
| | | | | | | 709/224 |
| 2019/0034812 | A1 | * | 1/2019 | Borrel | .................. | G01V 99/005 |

FOREIGN PATENT DOCUMENTS

CN          110188044 A       8/2019

* cited by examiner

*Primary Examiner* — Xin Sheng
(74) *Attorney, Agent, or Firm* — Ditthavong, Steiner & Mlotkowski

(57) ABSTRACT

A method is provided for transforming message logs into images. The method comprises the step of receiving a message log comprising a plurality of messages. The method further comprises the step of selecting a content of at least one message. In addition, the method comprises the step of transforming the content block-wise into decimal numbers. Furthermore, the method comprises the step of associating each decimal number with a color value thereby translating each message into a sequence of symbols. Moreover, the method comprises the step of generating an image from the symbols of the plurality of messages.

20 Claims, 6 Drawing Sheets

METHOD AND SYSTEM FOR TRANSFORMING MESSAGE LOGS INTO IMAGES

TECHNICAL FIELD

The invention relates to transforming message logs into images, especially for transforming service primitives of a communication message log generated by a communication device according to a certain protocol.

BACKGROUND ART

Generally, a communication device generates messages, also known as service primitives, according to a certain protocol. These messages can be collected through a message log, which lists the sequence of primitives exchanged between the different layers of the protocol. Normally, the message log is associated to a test with a defined purpose, for instance achieving a target throughput or verifying a certain functionality. In this case, a designated message analysis device performs the analysis of the messages in order to identify whether or not the test criteria are met.

For example, the document U.S. Pat. No. 7,272,800 B2 shows a message analysis device for storing and displaying messages by means of a parent and/or child generation of a specific message. The device can therefore evaluate information from a message header to determine and represent those parent-generation messages that casually triggered a specific message and/or those child-generation messages that are causally determined by the specific message.

However, such analysis of the test run is performed either by a human or by a script, which requires a significant amount of human intervention. Furthermore, modern testing approaches are adapted to use machine-learning algorithms to infer the problem out of a large number of message logs. The machine-learning algorithms in this setting mostly analyze text logs. Regardless of their simplicity and conventional application, text logs are not a suitable representation for message logs since many service primitives cannot be described by text.

Accordingly, there is a need to provide a method and a system for transforming message logs into images in order to facilitate the usage of a vast library of machine-learning algorithms.

SUMMARY OF THE INVENTION

According to a first aspect of the invention, a method is provided for transforming message logs into images. The method comprises the step of receiving a message log comprising a plurality of messages. The method further comprises the step of selecting a content of at least one message. In addition, the method comprises the step of transforming the content block-wise into decimal numbers. Furthermore, the method comprises the step of associating each decimal number with a color value thereby translating each message into a sequence of symbols. Moreover, the method comprises the step of generating an image from the symbols of the plurality of messages.

Therefore, the invention relates to an approach for translating message logs into images and thereby usher the usage of many well-established machine-learning algorithms. Herein, each message or primitive is translated into its binary content, which is always defined since primitives are created and processed in digital computers that represent these primitives through a finite alphabet (e.g., bits or bytes).

The block-wise transformation can be based on, for instance a byte assigned per block value. With the designated color value per blocks, each message is translated into a sequence of symbols and an image can be generated thereof from the plurality of messages.

According to a first preferred implementation form of said first aspect of the invention, the method further comprises the step of continuously receiving the plurality of messages in a chronological order and thereby transforming the messages sequentially. Additionally or alternatively, the message log can be received as a whole and therefore can be processed as a whole. Advantageously, the message log can be translated into an image with a greater flexibility.

According to a second preferred implementation form of said first aspect of the invention, the method further comprises the step of selecting the content according to a predefined metric adapted for machine learning analysis. Advantageously, pattern analysis by means of machine learning algorithms can be performed in a simplified manner.

According to a further preferred implementation form of said first aspect of the invention, a length of the sequence of symbols is defined by a respective length of a message. Advantageously, the message is translated into a sequence of symbols with ease.

According to a further preferred implementation form of said first aspect of the invention, the image corresponds to a matrix having a finite dimension, where the elements of the matrix correspond to the symbols of the plurality of messages. In this context, the messages can be stacked on top of each other as row vectors or beside each other as column vectors. Advantageously, the image generation by means of the matrix facilitates further flexibility.

According to a further preferred implementation form of said first aspect of the invention, the length of the matrix or the number of rows in the matrix correspond to the number of messages in the message log. In addition, the width of the matrix or the number of columns in the matrix correspond to the longest possible length of a message, which is available in the message log at the time of transformation. Additionally or alternatively, the length and width of the matrix may correspond to a predefined number. Herein, a predefined number could rely on statistical observation of the data, for instance 99% of the message logs have a number of messages between 50 and 100. Thus, the predefined number for the length and/or the width of the matrix as well as for the image can be 100.

According to a further preferred implementation form of said first aspect of the invention, the method further comprises the step of padding a message with zeroes in the case the length of the message is shorter than the width of the matrix. Additionally, the method further comprises the step of transforming a message up to the width of the matrix in the case the length of the message is longer than the width of the matrix. Alternatively, in the case of a statistically predefined number, the width of the matrix resp. the width of the image is fixed to the predefined number by padding a message having shorter length than the predefined number with zeroes. In addition, a message log having smaller number of messages than the predefined number would also be padded with zeroes and a message log having greater number of messages than the predefined number would only be processed up to the predefined number. Consequently, all messages are padded to a common length with respect to the resolution of the matrix resp. the resolution of the image based on the padding length either specific to the message log or derived by the analysis of a large number of message logs.

According to a further preferred implementation form of said first aspect of the invention, the color value is a greyscale color value having a range of 0 to 255. Advantageously, the message contents in term of blocks are easily distinguishable for pattern analysis by means of, for instance machine-learning algorithms.

According to a further preferred implementation form of said first aspect of the invention, the method further comprises the step of sectioning the plurality of messages into at least two subgroups according to a predefined criteria. In this context, the subgroups of the plurality of messages are interchangeable. Therefore, the messages are sub-divided into groups based on a criterion that is defined by for instance, the layers or parts of the layers of a protocol between which the message is transmitted, time sections of the message log, type of primitives and so on.

According to a further preferred implementation form of said first aspect of the invention, the method further comprises the step of defining a specific matrix for each subgroup having a common dimension. Hence, the subgroups collectively represent layers of matrices with finite symbols, having common lengths and widths.

According to a further preferred implementation form of said first aspect of the invention, the method further comprises the step of generating a three-dimensional image corresponding to the matrices of the subgroups. Additionally, the three-dimensional image can be generated either from all the messages in the message log or from a selective number of subgroups according to the predefined criteria.

According to a second aspect of the invention, a system is provided for transforming message logs into images. The system comprises an interface unit adapted to receive a message log comprising a plurality of messages. The system further comprises a selection unit adapted to select a content of at least one message. Moreover, the system comprises a translation unit adapted to perform block-wise transformation on the content for transforming the content into decimal numbers. In this context, the translation unit is further adapted to associate each decimal number with a color value in order to translate each message into a sequence of symbols, thereby generating an image from the symbols of the plurality of messages. Advantageously, the system transforms message logs into images and thereby facilitates the usage of many well-established machine-learning algorithms.

According to a first preferred implementation form of said second aspect of the invention, the interface unit is further adapted to receive the plurality of messages continuously in a chronological order and whereby the messages are sequentially transformed by the translation unit. Additionally or alternatively, the interface unit may receive the message log as a whole and therefore the translation unit may process the message log as a whole. Advantageously, the message log can be translated into an image with a greater flexibility.

According to a second preferred implementation form of said second aspect of the invention, the system further comprises a control unit adapted to provide a control signal to the selection unit for content selection, corresponding to a predefined metric, which is adapted for machine learning analysis. Advantageously, pattern analysis by means of machine learning algorithms can be performed in a simplified manner.

According to a further preferred implementation form of said second aspect of the invention, the control unit is further adapted to provide a control signal to the translation unit corresponding to transformation parameters in order to perform the block-wise transformation of the content. Herein, the transformation parameters can be based on, for instance a byte value for each block, a color value for each block and so on.

According to a further preferred implementation form of said second aspect of the invention, the system further comprises a storage unit for storing the plurality of messages of the message log in the chronological order. Therefore, the messages of the message log are sorted within the storage unit based on their order of generation by utilizing, for instance the time stamp associated with them.

According to a further preferred implementation form of said second aspect of the invention, the storage unit is updated periodically. Advantageously, the reliability of message reception is significantly improved.

According to a further preferred implementation form of said second aspect of the invention, the system is adapted to receive a set of message logs via the interface unit, each comprising a plurality of messages. In this context, the translation unit is further adapted to generate a set of images corresponding to the set of message logs either collectively or separately. Thus, numerous images are available for post processing and post synthesizing through machine-learning algorithms in order to perform error diagnosis, particularly the root cause analysis for test case failure.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Reference will now be made in detail to the embodiments of the present invention, examples of which are illustrated in the accompanying drawings. However, the following embodiments of the present invention may be variously modified and the range of the present invention is not limited by the following embodiments.

Figure 1:
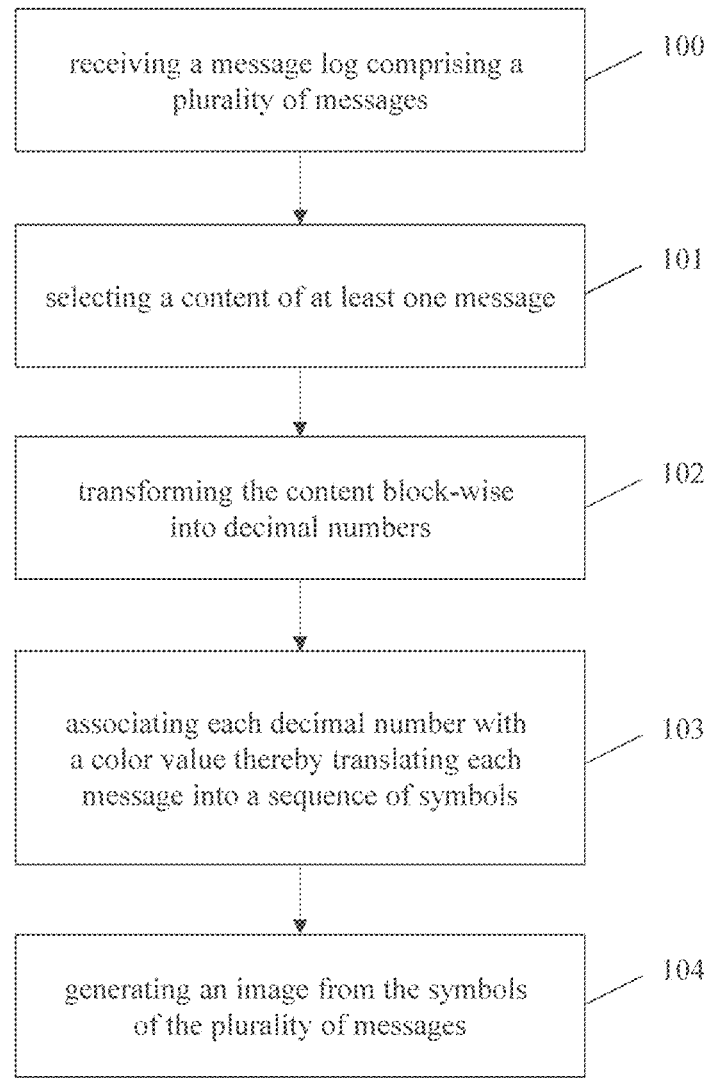
FIG. 1 shows an exemplary embodiment of the method according to the first aspect of the invention.

In FIG. 1, an exemplary embodiment of the method according to the first aspect of the invention is illustrated. In a first step 100, a message log is received that comprises a plurality of messages. In a second step 101, a content of at least one message of the plurality of messages is selected. In a third step 102, the content is transformed block-wise into decimal numbers. In a fourth step 103, each decimal number is associated with a color value so as to translate each message into a sequence of symbols. Finally, in a fifth step 104, an image is generated from the symbols of the plurality of messages.

Figure 2:
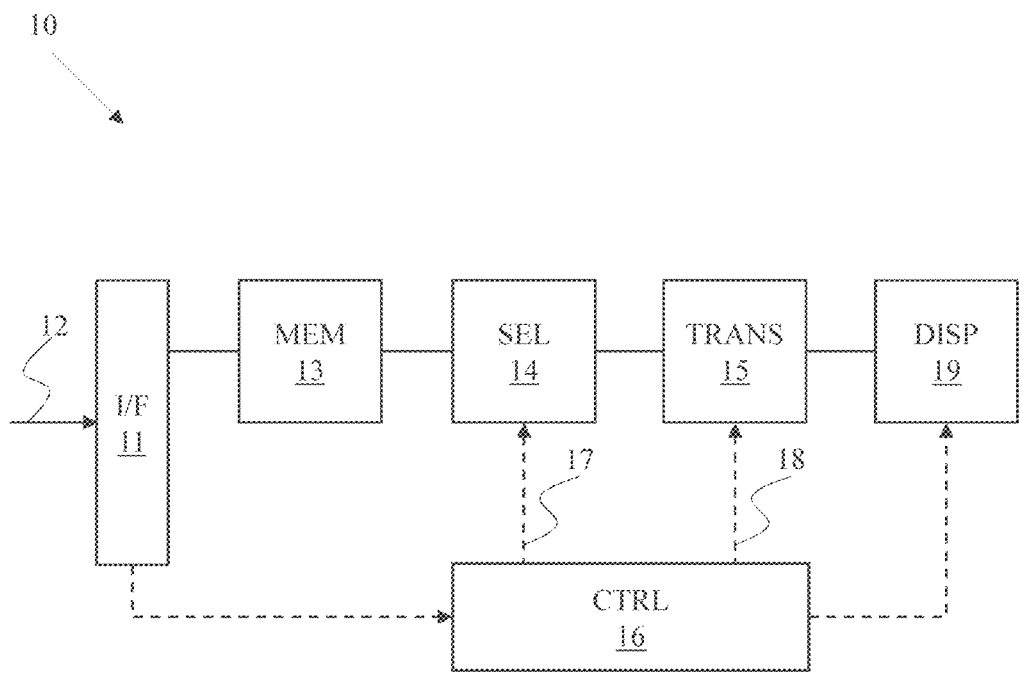
FIG. 2 shows an exemplary embodiment of the system according to the second aspect of the invention.

In FIG. 2, an exemplary embodiment of the system 10 according to the second aspect of the invention is illustrated. The system 10 comprises an interface unit or an input/output module 11 connected to a storage unit or a memory 13, which is further connected to a selection unit 14, which is moreover connected to a translation unit 15. The system 10 further comprises a display 19 connected to the translation unit 15. Moreover, the system comprises a control unit 16 adapted to receive control commands from the interface unit 11 and further adapted to generate control signals for the selection unit 14, translation unit 15 and the display 19. In this regard, the control unit 16 is connected to the interface unit 11 and respectively to the selection unit 14, translation unit 15 and the display 19 via signal lines (e.g., bus lines).

It is to be noted that the selection unit 14, the translation unit 15 and the control unit 16 can be constituted on a processing unit or processor performing the designated tasks en bloc. In this context, the processor may also be referred to as microcontrollers, microprocessors, microcomputers, etc., which may further be configured in hardware, firmware, software, or a combination thereof. The storage unit 13 can either be a dedicated memory to the interface unit 11 or can be a memory stacked along with the processor, especially within the selection unit 14. Therefore, the memory can further store the programs required for data processing and controlling of the processor and may temporarily store input and output information. In this case, the interface unit 11 is directly connected to the selection unit 14 either wirelessly or via cables.

The interface unit 11 preferably acts as an input/output interface for a user, for instance as a graphical user interface. The interface unit 11 further allows data input in order to receive messages of message logs either sequentially or in a stack. The messages are thereby stored in the storage unit 13 in a chronological order. The user may further provide control commands to the control unit 16 through the interface unit 11 for generating control signals. In this context, the control unit 16 generates a control signal 17 to the selection unit 14 for selecting a content of a message. The control unit 16 further generates a control signal 18 to the translation unit 15 for performing the block-wise transformation of the content.

The resulting image can be displayed on the display 19, where the user can manipulate the display 19, for instance through the interface unit 11 and correspondingly via the control unit 16, in order to select a specific image or part of an image to be displayed. Alternatively, the image can be further stored in the storage unit 13 and can be outputted through the interface unit 11 for post-processing in a device external to the system 10. As a result, the message transformation as well as the image generation are performed in a controllable manner.

Figure 3:
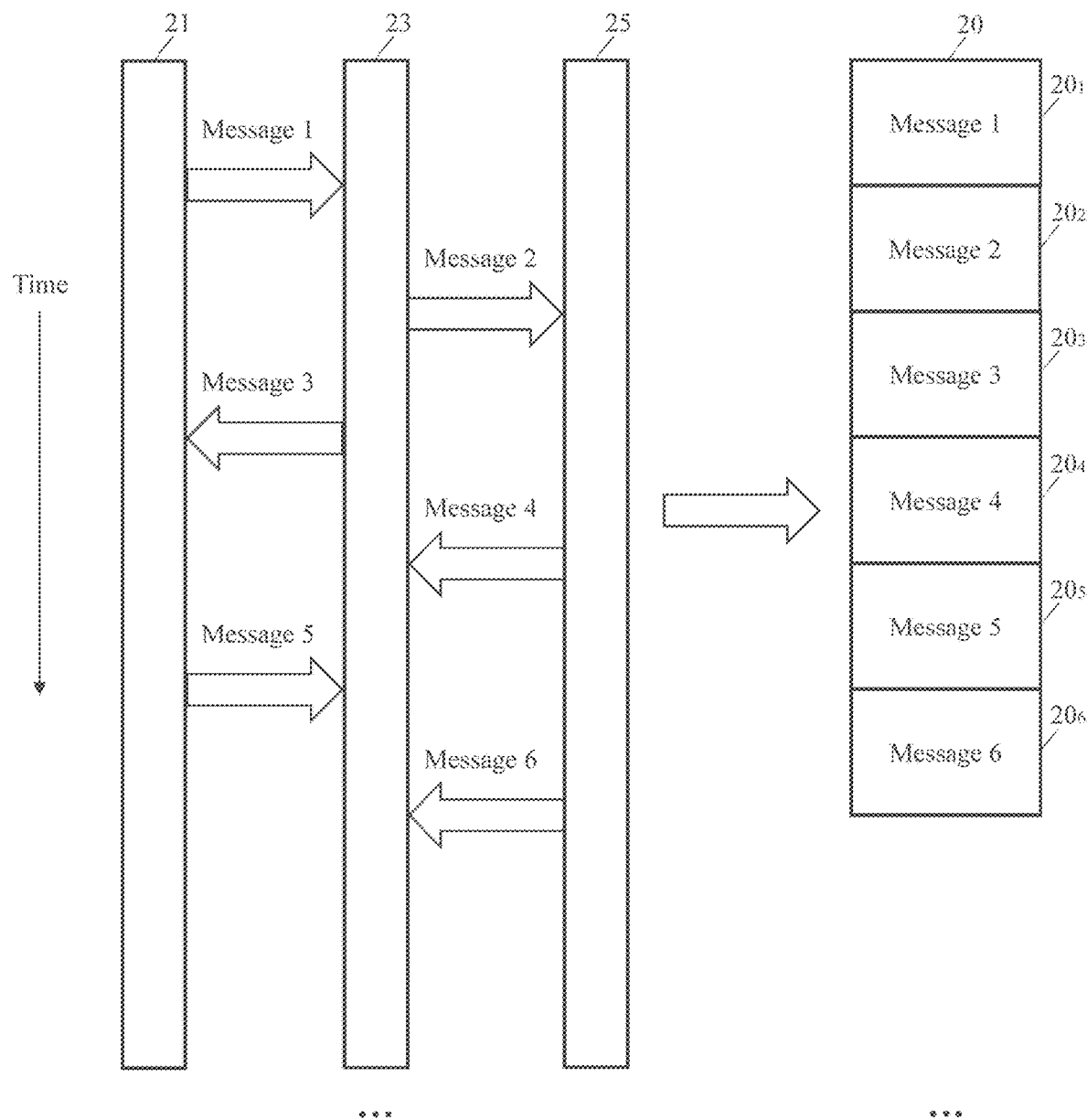
FIG. 3 shows a message exchange scenario between different layers of a protocol by way of an example.

In FIG. 3, a message exchange scenario between different layers of a protocol is illustrated by way of an example. Each protocol that communicates in a layered architecture, for instance based on the OSI Reference Model, communicates in a peer-to-peer manner with its remote protocol entity. Communication between adjacent protocol layers (i.e. within the same communications node) are managed by exchanging messages or primitives, between the layers. Generally, a variety of actions are associated with the primitives including but not limited to Connect, Data, Flow Control and Disconnect. Along FIG. 3, six messages or primitives $20_1, 20_2, 20_3, 20_4, 20_4, 20_6$ are illustrated, which are exchanged between the layers 21, 23, 25 of a protocol, according to their order of occurrences.

In particular, the first message $20_1$ is exchanged between layers 21 and 23 directing towards the layer 23. The second message $20_2$ is exchanged between layers 23 and 25 directing towards the layer 25. The third message $20_3$ is exchanged between layers 21 and 23 directing towards the layer 21. The fourth message $20_4$ is exchanged between layers 23 and 25 directing towards the layer 23. The fifth message $20_5$ is exchanged between layers 21 and 23 directing towards the layer 23. Lastly, the sixth message $20_6$ is exchanged between layers 23 and 25 directing towards the layer 23. The messages $20_1, 20_2, 20_3, 20_4, 20_4, 20_6$ are generally stacked in a message log 20 in an analogous way to their order of occurrences.

Figure 4:
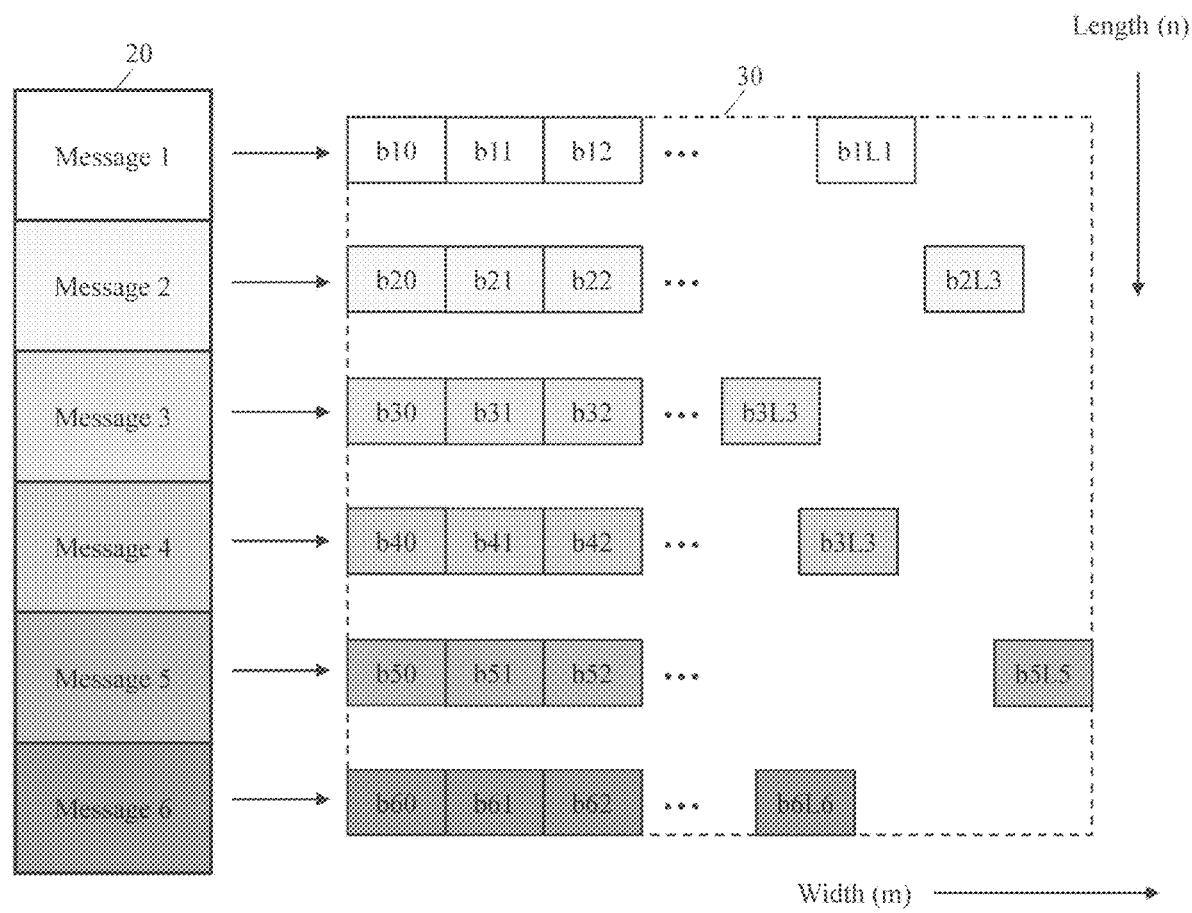
FIG. 4 shows a first exemplary embodiment of block-wise transformation scheme for the messages of a message log.

In FIG. 4, a first exemplary embodiment of block-wise transformation scheme for the messages of a message log 20 is illustrated. A message specific content is selected for each messages and are respectively transformed into blocks with a defined length (e.g., a byte). Since the binary contents of the messages are readily available from the time of their creation, a block transformation of the binary contents into decimal numbers can be performed without significant resources and/or operations. The decimal numbers are further assigned with a color value or code, preferably a greyscale color value having a range of 0 to 255.

Specifically, the first message is translated into blocks b10, b11, b12 . . . ; the second message is translated into blocks b20, b21, b22 . . . ; the third message is translated into blocks b30, b31, b32 . . . ; the fourth message is translated into blocks b40, b41, b42 . . . ; the fifth message is translated into blocks b50, b51, b52 . . . ; and the sixth message is translated into blocks b60, b61, b62 . . . and so on. The block representation of the contents of the messages results in a matrix 30 with a specific length (e.g., the number of rows) n and width (e.g., the number of columns) m, where each block resembles an individual element of the matrix 30. With the associated color values, the matrix 30 is transformed into an image having the same resolution n×m of the matrix 30, therefore having a length of n and a width of m.

In this context, the length of the image n can be defined based on the number of messages in the message log 20. Alternatively, the length of the image n can be defined by a predefined number or length based on statistical observation of a large number of message logs. Furthermore, the width of the image m can be defined by the largest message available in the message log 20. Alternatively, the width of the image m can be defined by the statistically observed predefined number. In either case, if a message having a length shorter than the width of the image n, the message is padded with zeroes to match with the value n. Similarly, if the message log 20 comprises smaller number of messages than the length of the image m, the message log 20 is padded with zeroes to match with the value m. Furthermore, if a message having a length greater than m, the message is treated up to the value m. Similarly, if the message log 20 comprises greater number of messages than n, the message log 20 is treated only up to the value n.

Thus, the message contents are translated into symbols with different color values and are stacked on top of each other in a form of matrix 30 having a finite number of symbols. Since the messages are padded to a common length, the resolution n×m of the matrix 30 represents an image of the translated messages with a defined length n and width m.

Figure 5:
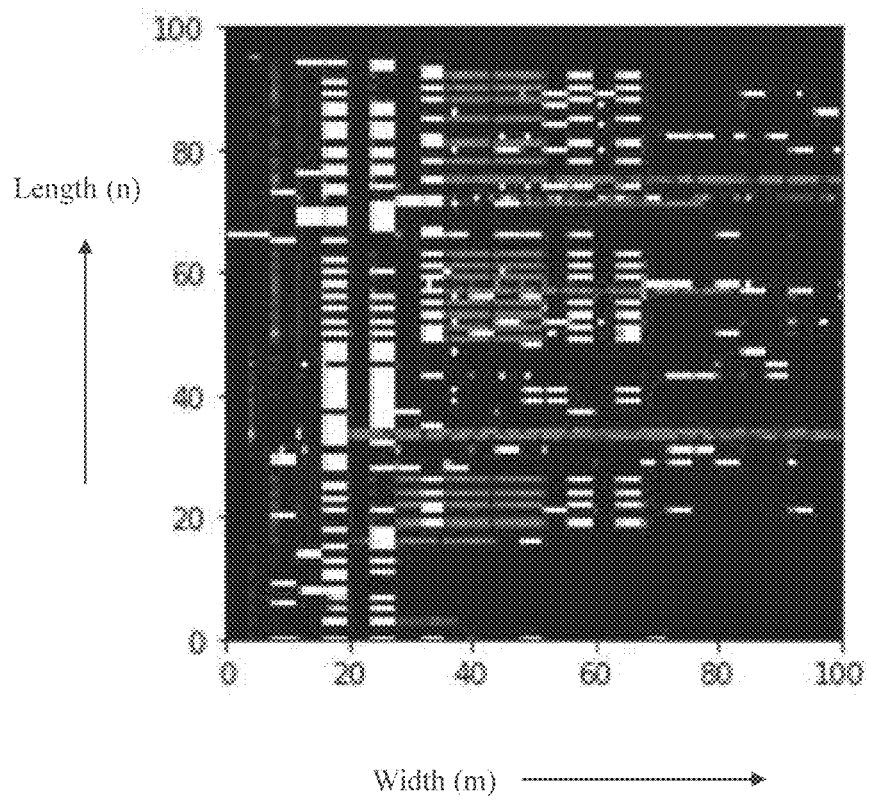
FIG. 5 shows an exemplary generated image of a message log.

In FIG. 5, a generated image of a message log 20 is illustrated by way of example only. The image corresponds to the greyscale representation of the matrix, for instance the matrix 30 shown in FIG. 4, having a resolution of n×m.

Herein, the image has a length n of 100 and a width m of 100. Each message of the message log 20 represents a line in the image, which displays the sequence of symbols for the respective message from left to right, thereby defining the length of the message content along the width of the image m. Furthermore, the length of the image n corresponds to the number of messages of the message log 20 that are transformed and are hereby distributed from bottom to top. It can be seen that the message log 20 is zero padded at the end of the length n near the value 100. It can be further observed that the length of the messages, i.e., the length of the sequence of the symbols for the translated messages differ from each other and some are required to be zero padded to match with the image width m.

Figure 6:
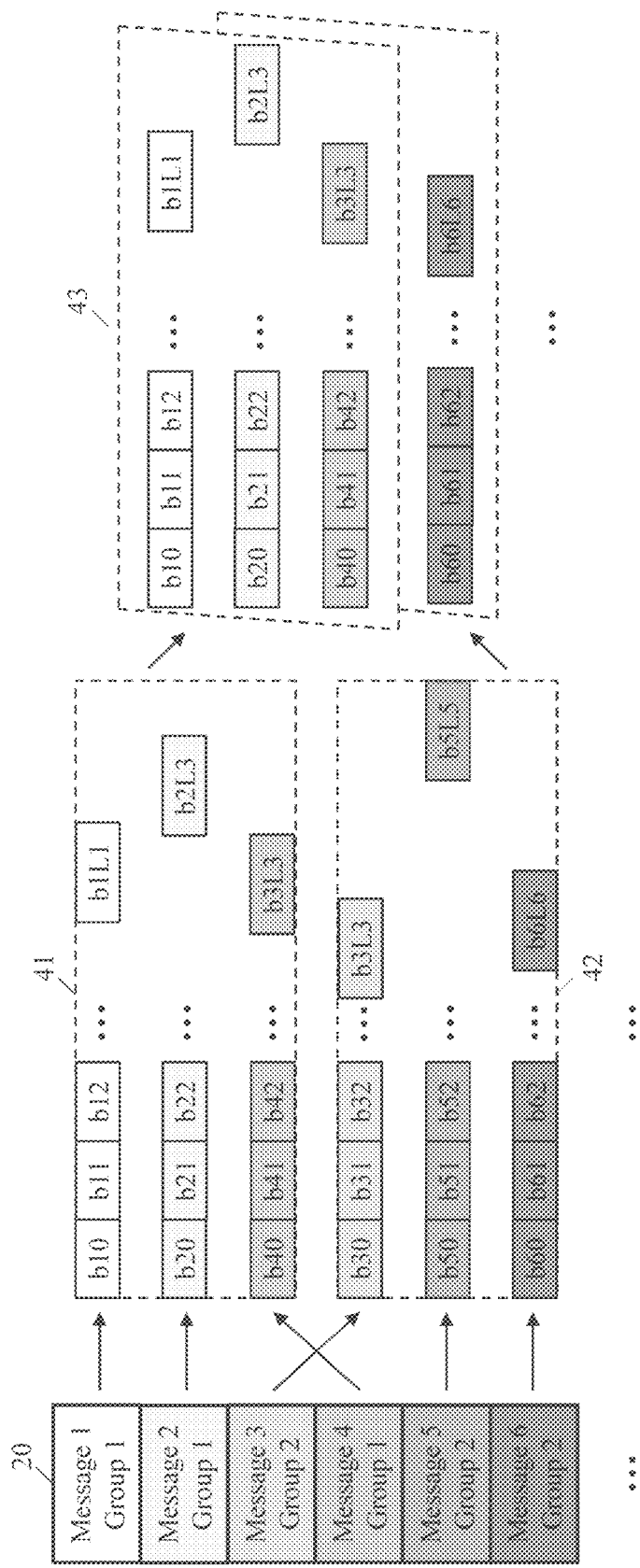
FIG. 6 shows a second exemplary embodiment of block-wise transformation scheme for the messages of a message log.

In FIG. 6, a second exemplary embodiment of block-wise transformation scheme for the messages of a message log 20 is illustrated. The block-wise transformation scheme illustrated herein differs from the block-wise transformation scheme of FIG. 4 in that the messages of the message log 20 are now segmented or grouped in two subgroups. Particularly, the first message, the second message and the fourth message are grouped into the first subgroup 41 whereas the third message, the fifth message and the sixth message are grouped into the second subgroup 42. In this context, each subgroup 41, 42 is defined with a matrix having a defined resolution, for instance n×m as discussed before, identical to each other. As a result, each subgroup 41, 42 corresponds to an individual matrix 30 of FIG. 4 comprising sequences of symbols respective to the messages associated with it.

At this point, the subgroups 41, 42 are stacked on top of each other thereby generating a three-dimensional image 43 with a number of channels equal to the number of subgroups 41, 42. It is important to note that the number of messages in the message log 20 and the number of subgroups 41, 42 are described herein by way of example only and not for limitation. Different number of messages in the message log 20 (e.g., fewer or more than six messages) as well as different number of subgroups (e.g., more than two subgroups) are also defined within the scope of the invention. Furthermore, the messages corresponding to each subgroup 41, 42 are exchangeable albeit they are partially illustrated.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for transforming message logs into images comprises the steps of:
    receiving a message log comprising a plurality of messages,
    selecting a content of at least one message,
    transforming the content block-wise into decimal numbers,
    associating each decimal number with a color value thereby translating each message into a sequence of symbols, and
    generating an image from the symbols of the plurality of messages,
    wherein the block-wise transformation is based on an assignment of at least one byte per block value.

2. The method according to claim 1, wherein the method further comprises the step of continuously receiving the plurality of messages in a chronological order and thereby transforming the messages sequentially.

3. The method according to claim 1, wherein the method further comprises the step of selecting the content according to a predefined metric adapted for machine learning analysis.

4. The method according to claim 1, wherein a length of the sequence of symbols is defined by a respective length of a message.

5. The method according to claim 1, wherein the image corresponds to a matrix having a finite dimension, where the elements of the matrix correspond to the symbols of the plurality of messages.

6. The method according to claim 5, wherein the length of the matrix corresponds to the number of messages in the message log and wherein the width of the matrix corresponds to the longest possible length of a message, which is available in the message log at the time of transformation.

7. The method according to claim 6, wherein the method further comprises the steps of:
    padding a message with zeroes in the case the length of the message is shorter than the width of the matrix, and
    transforming a message up to the width of the matrix in the case the length of the message is longer than the width of the matrix.

8. The method according to claim 1, wherein the color value is a greyscale color value having a range of 0-255.

9. The method according to claim 1, wherein the method further comprises the step of sectioning the plurality of messages into at least two subgroups according to a predefined criteria.

10. The method according to claim 9, wherein the subgroups of the plurality of messages are interchangeable.

11. The method according to claim 9, wherein the method further comprises the step of defining a specific matrix for each subgroup having a common dimension.

12. The method according to claim 11, wherein the method further comprises the step of generating a three-dimensional image corresponding to the matrices of the subgroups.

13. A system for transforming message logs into images comprises:
    an interface adapted to receive a message log comprising a plurality of messages,
    a selector adapted to select a content of at least one message, and a translator adapted to perform block-wise transformation on the content for transforming the content into decimal numbers, wherein the translation unit translator is further adapted to associate each decimal number with a color value in order to translate each message into a sequence of symbols, thereby generating an image from the symbols of the plurality of messages, and wherein the block-wise transformation is based on an assignment of at least one byte per block value.

14. The system according to claim 13, wherein the interface is further adapted to receive the plurality of messages continuously in a chronological order and whereby the messages are sequentially transformed by the translator.

15. The system according to claim 14, wherein the system further comprises memory for storing the plurality of messages of the message log in the chronological order.

16. The system according to claim 15, wherein the memory is updated periodically.

17. The system according to claim 13, wherein the system further comprises a controller adapted to provide a control signal to the selector for content selection, corresponding to a predefined metric, which is adapted for machine learning analysis.

18. The system according to claim 17, wherein the controller is further adapted to provide a control signal to the translator corresponding to transformation parameters in order to perform the block-wise transformation of the content.

19. The system according to claim 13, wherein the system is adapted to receive a set of message logs via the interface, each comprising a plurality of messages.

20. The system according to claim 19, wherein the translator is further adapted to generate a set of images corresponding to the set of message logs either collectively or separately.

* * * * *